(12) United States Patent
Duits et al.

(10) Patent No.: US 8,791,661 B2
(45) Date of Patent: Jul. 29, 2014

(54) LINEAR ACTUATOR

(75) Inventors: Johannes Andrianus Maria Duits, Bodegraven (NL); Mario Rossi, Rivoli (IT)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/813,239

(22) PCT Filed: Jul. 30, 2010

(86) PCT No.: PCT/EP2010/004666
§ 371 (c)(1),
(2), (4) Date: Mar. 21, 2013

(87) PCT Pub. No.: WO2012/013207
PCT Pub. Date: Feb. 2, 2012

(65) Prior Publication Data
US 2013/0207584 A1    Aug. 15, 2013

(51) Int. Cl.
*G05D 3/00* (2006.01)
(52) U.S. Cl.
USPC ............ 318/466; 318/135; 318/266; 318/468
(58) Field of Classification Search
USPC ......... 318/671, 626, 115, 119, 135, 266, 280, 318/466, 468, 554, 556, 114, 603, 627; 310/12.14, 12.17, 49.18
See application file for complete search history.

(56) References Cited

U.S. PATENT DOCUMENTS

| | | | |
|---|---|---|---|
| 4,572,951 A | 2/1986 | Toda et al. | |
| 5,053,685 A * | 10/1991 | Bacchi | 318/135 |
| 5,276,722 A * | 1/1994 | Aoki et al. | 377/49 |
| 2002/0050756 A1 | 5/2002 | Ito | |
| 2006/0293818 A1 | 12/2006 | Lu et al. | |
| 2009/0091287 A1* | 4/2009 | Bastholm | 318/603 |
| 2009/0151490 A1* | 6/2009 | Kristensen | 74/89.37 |
| 2010/0315031 A1* | 12/2010 | Jensen | 318/627 |

* cited by examiner

*Primary Examiner* — Antony M Paul
(74) *Attorney, Agent, or Firm* — Bryan Peckjian; SKF USA Inc. Patent Department (57) ABSTRACT

A linear actuator comprising a spindle, a spindle nut, a transmission, an electrical motor, and an actuation element, is arranged to linearly move the actuation element by means of an interaction of the spindle and the spindle nut, which interaction is being driven by the electrical motor through the transmission. A position of the actuation element, the relative position between spindle and spindle nut, is determined by means of an absolute rotary position sensor and a counter. The counter keeps track of the number of under-flows and overflows the absolute rotary position sensor generates during movement of the actuation element. A combination of a value from the absolute rotary position sensor and a count from the counter determines the position.

10 Claims, 5 Drawing Sheets

LINEAR ACTUATOR

CROSS-REFERENCE

This application is the U.S. national stage of International Application No. PCT/EP2010/004666 filed on Jul. 30, 2010, which is herein incorporated by reference in its entirety.

TECHNICAL FIELD

The invention is related to linear actuators, especially to linear actuators driven by an electrical motor, in particular the determination of the position of an actuation element of a linear actuator.

BACKGROUND

Linear actuators are commonly used when a controlled linear motion is desired instead of a rotational movement. One use of linear actuators is to be able to remotely open and close windows, for example ventilation windows of green houses. Pneumatic and hydraulic actuators have been used as they are commonly linear by nature. Both pneumatic and hydraulic actuators have many disadvantages, energy efficiency being one, which is why there has for some time been a shift towards linear actuators driven by electrical motors.

To determine the position of an actuation element of a linear actuator, linear actuators are commonly provided with position sensors. Formerly rotary potentiometers were used. Due to the mechanical nature of potentiometers, they wear out, thus lowering the reliability of the linear actuators they were used in. More modern linear actuators will most likely use wear resistant technology such as semiconductor Hall-sensors that are contact-less sensors. The US patent application US 2009/0091287 describes a linear actuator making use of Hall-sensors. Unfortunately the suggested system requires that the sensors and micro processor always need to be active. Thus there seems to be room for improvement in determining a position of an actuation element of a linear actuator.

SUMMARY

An object of the invention is to define a method and means to determine the position of an actuation element of a linear actuator.

The aforementioned object is achieved according to the invention by the use of a linear actuator comprising a spindle, a spindle nut, a transmission, an electrical motor, and an actuation element, which is arranged to linearly move the actuation element by means of an interaction of the spindle and the spindle nut, which interaction is being driven by the electrical motor through the transmission. The actuation element is moved between a first end stop and a second end stop, defining a complete stroke. A position of the actuation element, the relative position between spindle and spindle nut, is determined by means of an absolute rotary position sensor and a counter. The absolute rotary position sensor is coupled to a rotating part of the linear actuator and will under-flow/over-flow at least once during a complete stroke; that is the rotational angle through which the absolute rotational position sensor can determine the angle of, is less than the complete rotational angle of the rotating part during a complete stroke. Thus during a complete stroke, the absolute rotary position sensor will under-flow, that is go from an output value representing the smallest angle to an output value representing the largest angle, or over-flow, that is go from an output value representing the largest angle to an output value representing the smallest angle, at least once. The counter keeps track of the number of under-flows and over-flows the absolute rotary position sensor generates during movement of the actuation element. A combination of a value from the absolute rotary position sensor and a count from the counter determines the position.

The aforementioned object is further achieved according to the invention by a linear actuator comprising an electrical motor, a transmission, a spindle, a spindle nut, an actuation element and a control unit. The electrical motor, through the transmission and interaction between spindle and spindle nut, drives the actuation element to move linearly between a first end stop and a second end stop. According to the invention, to determine a position of the actuation element, the control unit comprises an absolute rotary position sensor outputting a value representing an angle. The value can be the angle or just a numeric value that represents an angle, for example a 10 or 12 bit number. The control unit further comprises a counter keeping a count. The absolute rotary position sensor is coupled to the linear actuator in such a way that the rotational angle through which the absolute rotational position sensor will give an absolute value is less than the rotational angle through which the absolute rotational position sensor is subjected during a movement of the actuation element between the first end stop and the second end stop. This causes the value of the absolute rotational position sensor to under-flow or over-flow at least once during such a movement between end stops. The counter is arranged to keep track of the under-flows and over-flows of the value in the count. Thus the combination of the value of the absolute rotational position sensor and the count of the counter, determines the position of the actuation element.

The absolute rotary position sensor can be a full turn or a partial turn absolute rotary position sensor. Suitably the control unit further comprises a non-volatile memory. The control unit is then arranged to store the count of the counter in the non-volatile memory when there is a shutdown of the linear actuator. The shutdown can be by command or by removal of power from the linear actuator. The control unit can suitably be arranged to store the count of the counter in the non-volatile memory when the rate of movement of the actuation element as indicated by the absolute rotary position sensor, falls below a predetermined limit. This in case the inertia of the system keeps the actuation element moving after a shutdown/removal of power from the electrical motor.

As a way of ensuring that track is kept of the count, some embodiments can have the control unit comprise a non-volatile memory and be arranged to store the count of the counter in the non-volatile memory when the rate of movement of the actuator element as indicated by the absolute rotary position sensor, falls below a predetermined limit.

If the embodiment comprises a non-volatile memory, then in addition to storing the count, the control unit can be arranged to simultaneously store in the non-volatile memory the value of the absolute rotary position sensor. This can then in some embodiments allow the control unit to be arranged to perform a check during power-up of the linear actuator to determine if there is a difference between a stored value of the absolute rotary position sensor in the non-volatile memory and a value of the absolute rotary position sensor at power-up, and if there is a difference to then determine if that difference is within predetermined limits or not. Has the actuation element of the linear actuator moved during a shut down, and if so by how much. The detectable movement is restricted by the range of the absolute rotary position sensor since the counter is not updated during shutdown/when power is removed.

The control unit can in some embodiments either comprise a capacitor or a battery to provide energy for storage of the count of the counter and possibly the value of the absolute rotary position sensor to the non-volatile memory. The additional energy is to provide the possibility to at least store the count of the counter and possibly also to measure and store the value of the absolute rotary position sensor even if all external power is removed.

Suitably the control unit is also arranged to determine end stops of the linear actuator. This is done by driving the electrical motor in both directions until the absolute rotary position sensor indicates that the actuation element is not moving. The count of the counter and the value of the absolute rotary position sensor are used. Suitably the control unit is arranged to drive the electrical motor at a limited torque/power level during end-stop determination. The control unit is preferably arranged to determine the end stops to be at a predetermined distance before the position indicated by the absolute rotary position sensor. When the absolute rotary position sensor indicates that an end stop has been reached by the absence of change of the value, then the motor is reversed until the absolute rotary position sensor starts to output a changing value that indicates that the actuation element has started to move. This position can be used as end stop, or a position pulled back even further back a predetermined amount.

The control unit can be arranged, by means of the absolute rotary position sensor, to determine if there is movement of the actuation element when the actuator is not driven by the electrical motor. If it is determined that there is movement even though the actuator is not driven, then an alarm message can be generated and communicated and/or the electrical motor can be activated to oppose this movement and thus create an active stop of movement.

By using an absolute rotary position sensor in combination with storing a count in non-volatile memory, a linear actuator according to the invention can be calibrated and checked and then stored/be powerless for a virtually infinite amount of time since it does not have to rely on batteries or another power source to continuously keep sensors and a micro processor active to not loose calibration or other settings.

Other advantages of the invention will become apparent from the detailed description below.

BRIEF DESCRIPTION OF THE DRAWINGS

The invention will now be described in more detail for explanatory, and in no sense limiting, purposes, with reference to the following figures, in which.

DETAILED DESCRIPTION

In order to clarify the inventions, some examples of its use will now be described in connection with FIGS. 1 to 7

Figure 1:
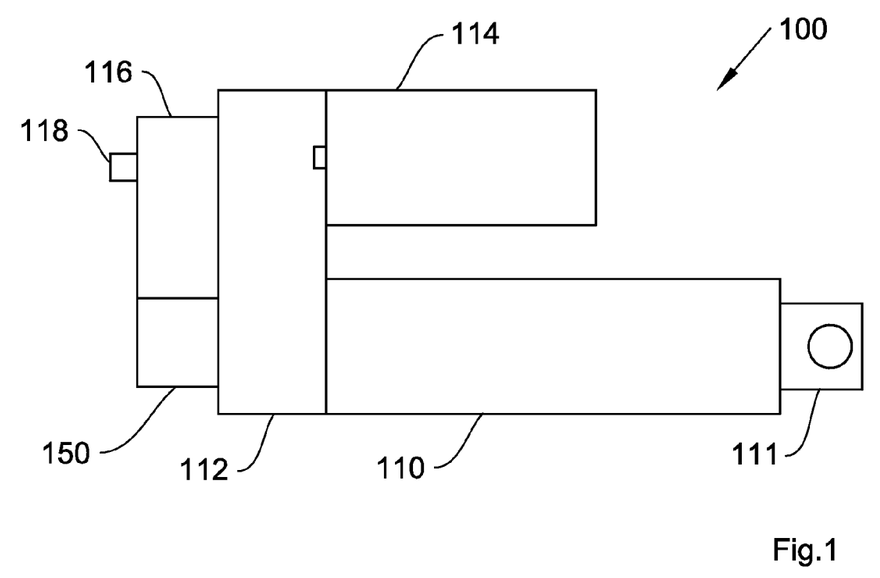
FIG. 1 shows a view of a linear actuator unit according to the invention.

FIG. 1 shows a view of a linear actuator unit 100 according to the invention. The linear actuator 100 comprises an electrical motor 114 which is coupled to a transmission 112, which in turn is coupled to a spindle and spindle nut arrangement to thereby linearly drive an actuation rod/element 111. The spindle and spindle nut arrangement, in this illustration covered by the spindle outer tube 110, will convert a rotary motion of the electrical motor 114 and transmission 112 to a linear motion of the actuation rod/element 111. Either the spindle or the spindle nut is driven by/coupled to the transmission depending on the type of linear actuator.

The linear actuator 100 according to the invention further comprises an absolute rotary position sensor 150, control electronics 116 and a power/control connector 118. The power/control connector(s) 118 are to provide the linear actuator 100 with power and a control connection to either discrete control switches, a bus system, serial or parallel, according to an industry standard or a proprietary one, or a connection to a network, industry standard or proprietary, for controlling and possibly also monitoring the linear actuator. In some embodiments, a control connection is not needed as these linear actuators are directly controlled by connection and reversing of the power.

In some embodiments the control electronics 116 will comprise circuitry for conversion of the value output of the absolute rotary position sensor, into a linear position of the actuation rod/element 111. Often it is not necessary to know a numerical value of the position, but only for example when an end stop is being reached.

Figure 2:
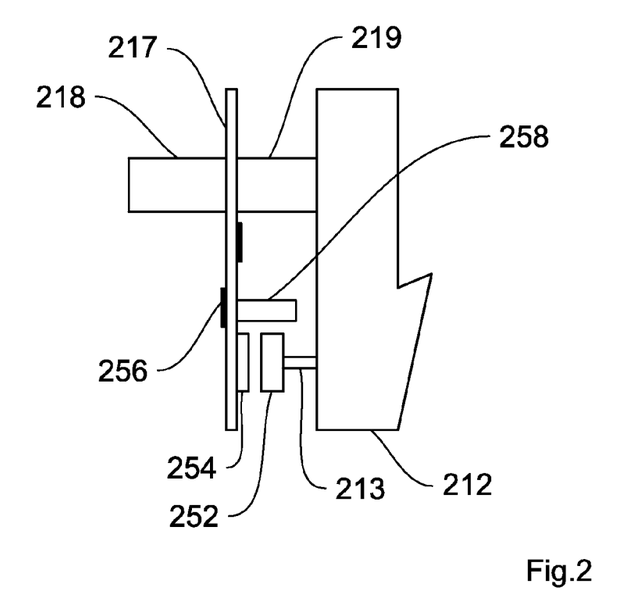
FIG. 2 shows a cross section of a part of the linear actuator unit according to the invention.

FIG. 2 shows a part of the linear actuator unit according to the invention with a cover of the control electronics removed thus displaying a circuit board 217 comprising circuitry 256 to determine the rotary position of an absolute rotary position sensor 252, 254. The absolute rotary position sensor 252, 254 will suitably be of a full turn or partial turn type and preferably not of a multi-turn type as these are more expensive and not necessary according to the invention. As the rotating part to which the absolute rotary position sensor 252, 254 is coupled 213 will be of a multi-turn nature, then the circuitry 256 further comprises a counter to count the number of over/under flows of the absolute rotary position sensor 252, 254. The absolute rotary position sensor 252, 254 can be mechanically coupled 213 to a rotating part such as a rotor of the electrical motor, an axle or gear of the transmission 212, or directly coupled 213 to the spindle or spindle nut of the linear actuator. It is preferable to couple the absolute rotary position sensor to the spindle/screw instead of the motor or another part of the transmission as the measurement then does not get subjected to any play in the gear train. It even makes it possible to correct for gear train play.

The absolute rotary position sensor 252, 254 suitably comprises two parts, one rotating 252 and one stationary. The rotating part 252 of the absolute rotational position sensor, is suitably a magnet or magnet ring, mounted directly or indirectly, i.e. coupled to, a rotating part of the linear actuator, such as a spindle or spindle nut. The non-rotating part 254 of the absolute position sensor, suitably a hall effect sensor, mounted in proximity to the rotating part 252 of the absolute position sensor, suitably on or coupled to the circuit board.

The circuitry 256 suitably also comprises non-volatile memory for storage of the count at the time of power shutdown. To properly enable the function of saving the count and optionally the value of the absolute rotational position sensor at or during shutdown, there are embodiments comprising a power storage 258, such as a capacitor/battery to ensure that there is enough power to store the count and possibly the value, when the linear actuator is shut down.

Finally there is provided means to pass the electrical power 219 through to the electrical motor.

Figure 3:
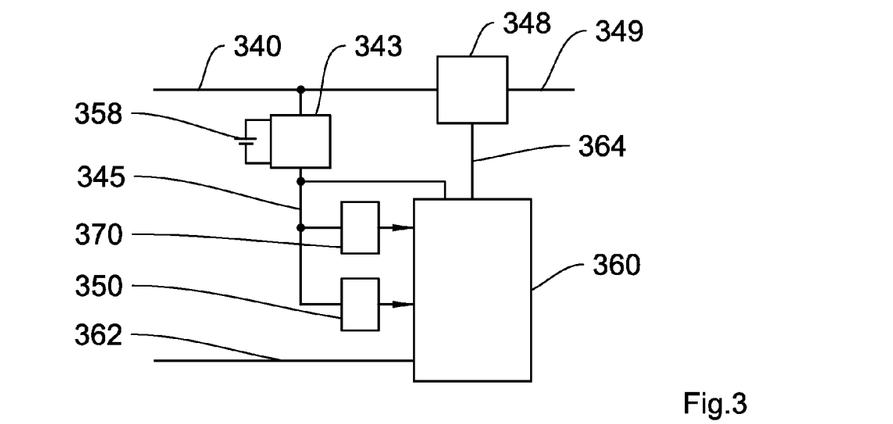
FIG. 3 shows a functional block diagram of the controller and absolute position sensor according to the invention.

FIG. 3 illustrates a functional block diagram of the controller 360, absolute rotary position sensor 350 and surrounding circuitry according to the invention. There will be electrical power supply line(s) 340 that are regulated and controlled 348 before being fed as power 349 to an electrical motor (not shown). Control signals 364 from the controller 360 determine how the control circuitry 348 for the electrical motor will regulate the power supply 340. The electrical motor can be controlled to determine end stops, be given a lower power close to the end stops, determine direction of operation and also be provided with safety functions such as overload protection. End stop determination and overload protection are according to the invention done in conjunction with the absolute rotary position sensor 350. If a rate of movement according to the absolute rotary position sensor 350 changes for a given amount of power, this could be an indication of approaching an end stop during end stop calibration; or, during ordinary operation if the linear actuator is not close to an end stop, could be an indication of increasing load. It is also possible to detect any drift in the mechanical system when the actuator is not driven. If movement is detected, either a warning/error message can be generated and sent and/or the motor can be activated to counter this undesired movement, i.e. act as an active stop.

The electronic circuitry is supplied with regulated power through a power supply regulator 343. The regulator 343 suitably has reserve power 358 comprising for example a capacitor or a battery. The reserve power 358 is used to ensure that the controller 360, non-volatile memory 370 and absolute rotary position sensor 350 have sufficient power to fulfill shutdown sequences even though the main power 340 has gone. Shutdown sequences will typically comprise saving a shutdown count and possibly a shutdown value into the non-volatile memory 370.

Preferably the controller 360, such as a micro controller or ASIC, is connected to a control bus or network through one or more control lines 362. Such a control network can then suitably control more than one linear actuator.

Figure 4A:
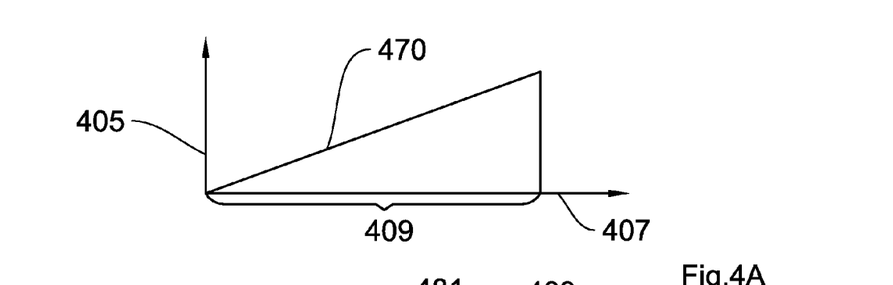
FIGS. 4A-4C show different types of absolute rotary position sensors and their output over a full turn.
Figure 4B:
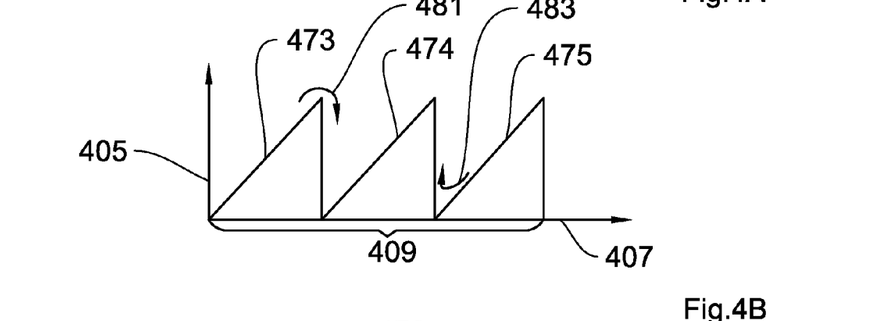
Figure 4C:
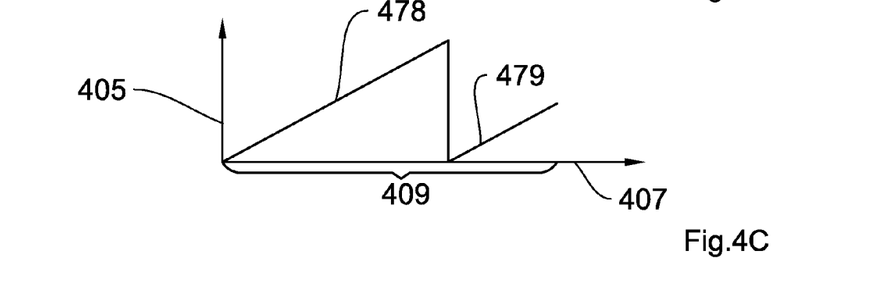

FIGS. 4A, 4B, and 4C show different types of absolute rotary position sensors and their output over a full turn of a rotating element that the absolute rotary position sensor is connected to. The figures illustrate the absolute rotary position sensor output 405 in relation to rotational angle 407, where one full turn 409 is indicated. FIG. 4A illustrates an absolute rotary position sensor with a full turn 470 unambiguous output. FIG. 4B illustrates an absolute rotary position sensor with a third of a full turn 473, 474, 475 of unambiguous output. And finally FIG. 4C illustrates an absolute rotary position sensor with less than a full turn 478, 479 of unambiguous output. Since the linear actuator according to the invention also uses an under-flow/over-flow count, it does not matter if the absolute rotary position sensor has a full turn or a partial turn unambiguous output. In FIG. 4B, there is illustrated an overflow 481 when the output value 405 goes from a maximum angle representation to a minimum angle representation and also illustrated an underflow 483 when the output value goes from a minimum angle representation to a maximum angle representation.

It would be ideal to have a multi-turn absolute rotary position sensor with more turns than a measured rotating member will rotate during a full stroke of the actuation element. However, with the current invention of having a limited absolute rotary position sensor in combination with an over-/under-flow counter, a cheap and robust solution is given. The linear actuator according to the invention is able to determine if there has been movement of the actuation element during shutdown. The value of the absolute rotary position sensor has to be saved and the allowable/detectable movement during shutdown is limited by the range of the absolute rotary position sensor. Detectable, thus allowable movement during shutdown is plus/minus half the range of the absolute rotary position sensor. The solution according to the invention does not rely on any power being supplied when the linear actuator is shut off. It is only required during a shutdown phase to be able to get a higher accuracy of where the actuation element really is when stopped.

Figure 5:
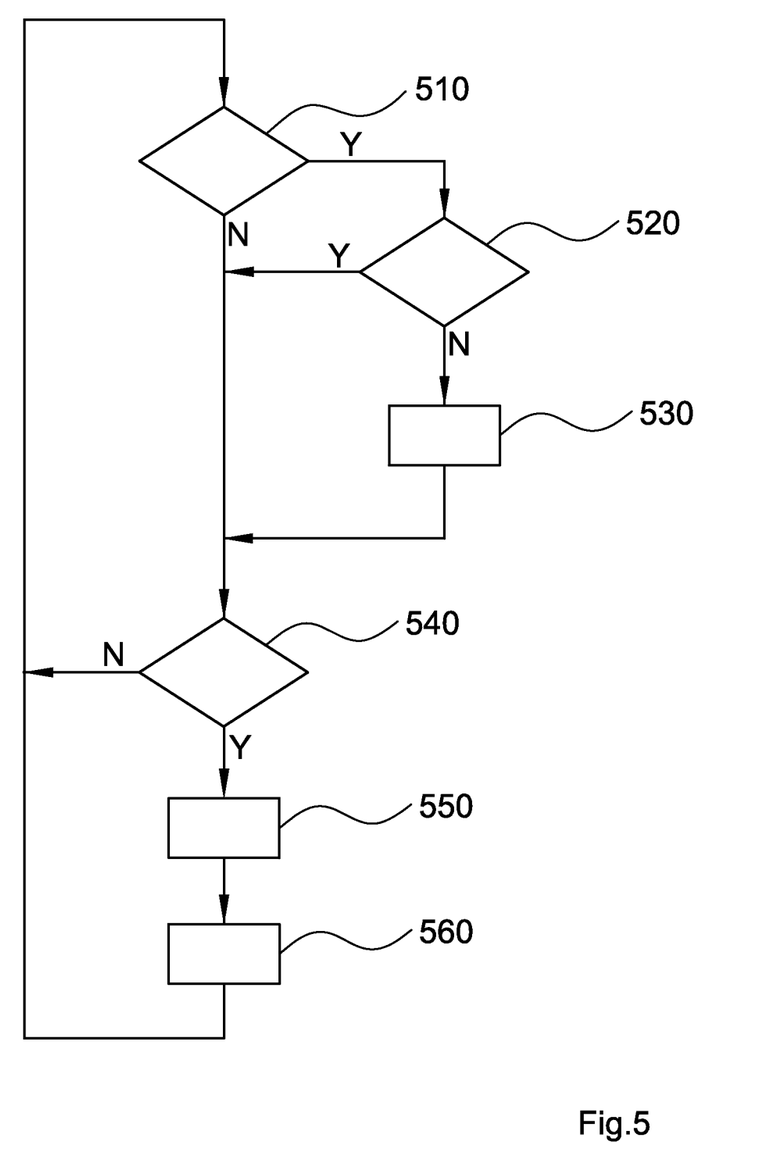
FIG. 5 shows a flow chart of a basic functionality of the absolute position sensor according to the invention.

FIG. 5 shows a flow chart of a basic functionality of the absolute position sensor according to the invention. In a first step 510 it is determined if there is a rotation or not. In a second step 520, if there is rotation, it is determined if we are still within the absolute rotational position sensor range, or if there is an under or overflow of the sensor output. In a third step 530, if it is determined that there is an under- or overflow, then the counter is adjusted accordingly by counting up one if there has been an overflow and by counting down one if there has been an underflow. In a fourth step 540 it is determined if there is a power loss/shutdown or not. In a fifth step 550 if it is determined that there is a power loss/shutdown, then the count is stored in a non-volatile memory. Optionally in a sixth step 560, if there is a power loss/shutdown, then the absolute rotary position sensor value is also stored in a non-volatile memory.

Figure 6:
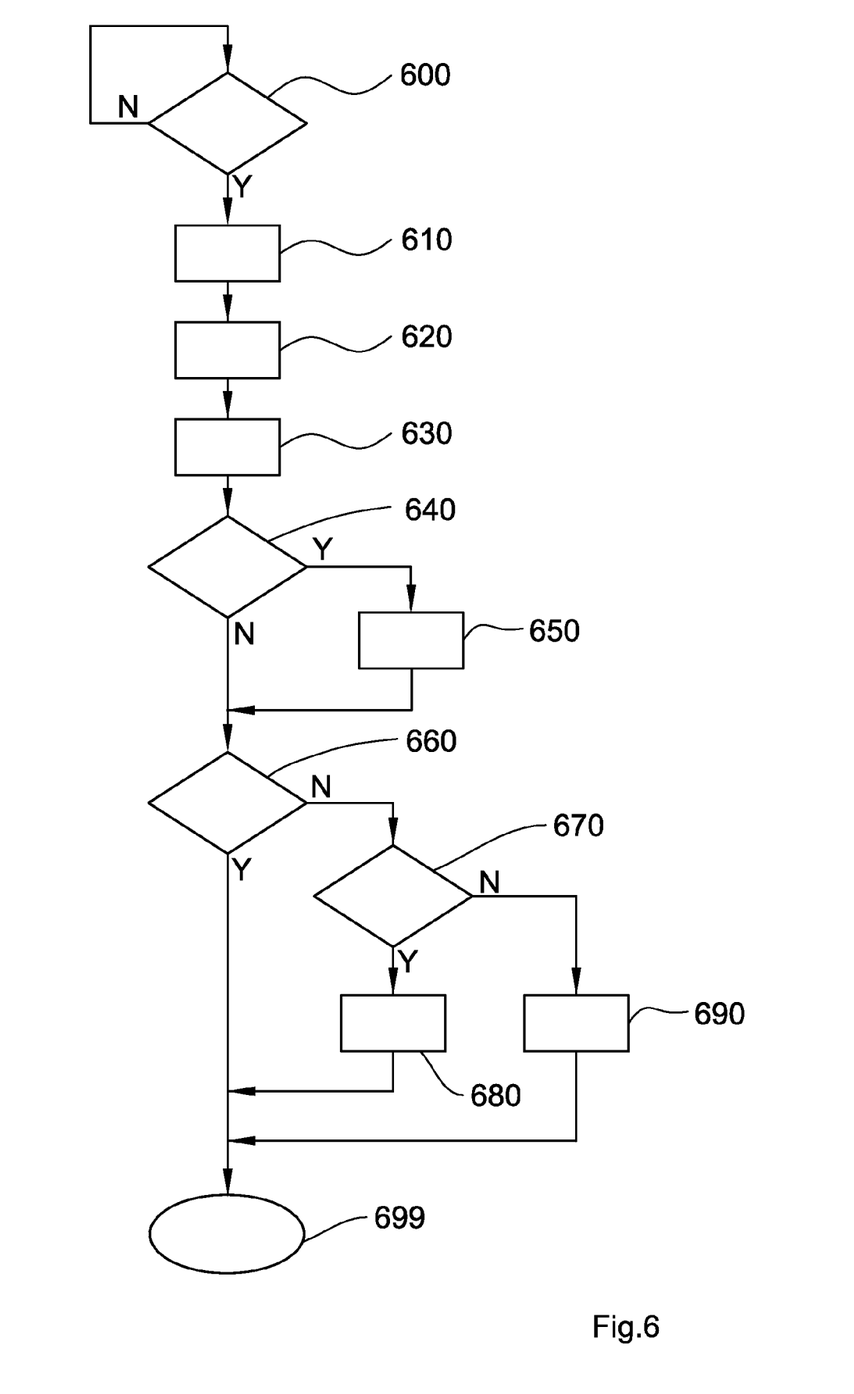
FIG. 6 shows a flow chart of an optional check of a linear actuator with an absolute position sensor according to the invention.

FIG. 6 shows a flow chart of an optional check of a linear actuator with an absolute position sensor according to the invention. In a first step 600 it is determined if there is a power-up or not, if there is, then this routine/process is executed. In a second step 610 a stored count in the non-volatile memory is retrieved and the counter is updated with this count. In a third step 620 a stored value of the absolute rotary position sensor in the non-volatile memory is retrieved. In a fourth step 630 a current value of the absolute rotary position sensor is acquired/determined. In a fifth step 640 the retrieved stored value is compared with the determined current value of the absolute rotary position sensor, to determine if there has been an underflow/overflow during shutdown or not. In a sixth step 650, if it determined that there has been an overflow/underflow, then the counter is updated accordingly by counting up one if there has been an overflow and by counting down one if there has been an underflow. In a seventh step 660 the retrieved stored value is compared with the determined current value, and if the difference is less than a first predetermined amount, then the routine/process is terminated without further action with an eleventh step 699. If the difference is equal or greater than the first predetermined amount, then the process continues with an eighth step 670 where the retrieved stored value is compared with the determined current value in relation to a second predetermined amount. If it is determined that the difference is less than the second predetermined amount then in a ninth step 680 a warning action is performed. If it is determined that the difference is equal or greater than the second predetermined amount then in a tenth step 690 an error action is performed. The error action can include a recalibration. In the eleventh step 699 further processing after power-up is done.

Figure 7:
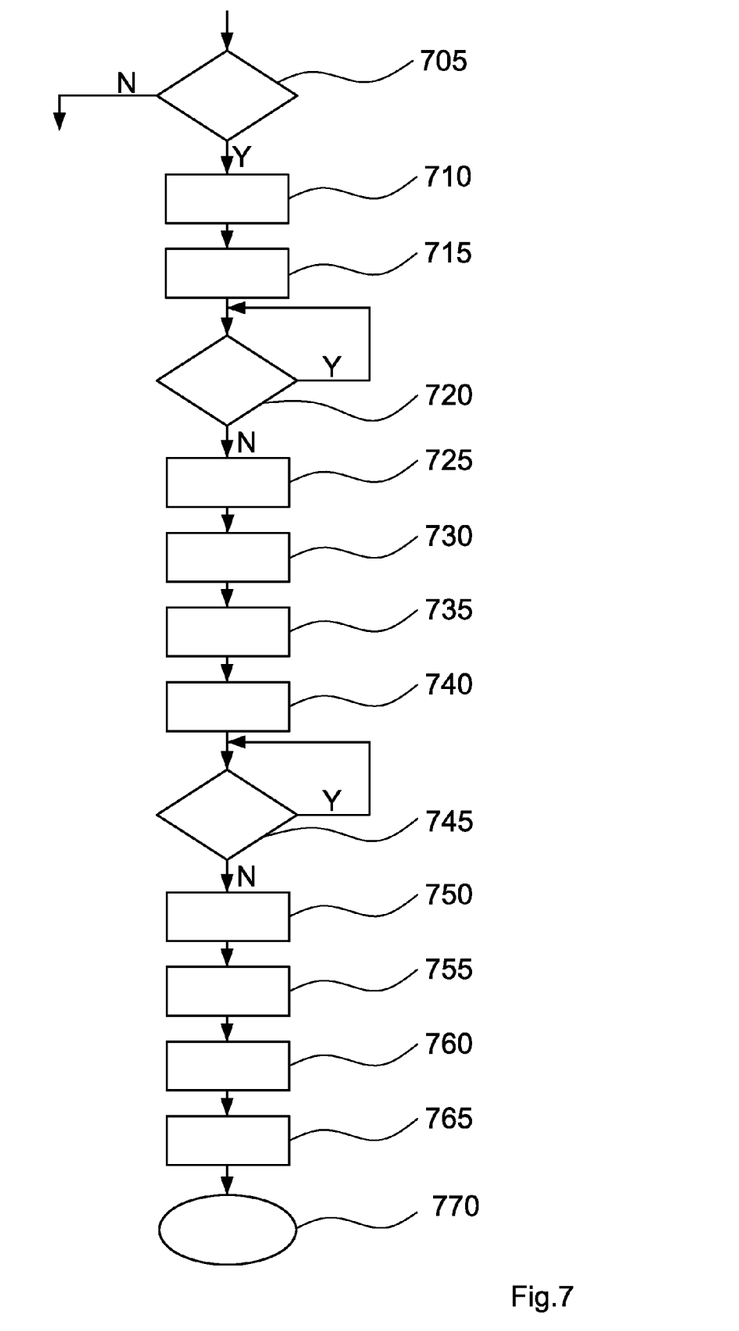
FIG. 7 shows a flow chart of an optional virtual end stop determination of a linear actuator with an absolute position sensor according to the invention.

FIG. 7 shows a flow chart of an optional virtual end stop determination of a linear actuator with an absolute position sensor according to the invention. In a first step 705 it is determined if it is the first power-up or a recalibration, if so then this routine/process is executed. In a second step 710 the electrical motor power is set to a low/calibration value. In a third step 715 the electrical motor/linear actuator is set to run in a first direction. In a fourth step 720 it is determined if the absolute rotary position sensor registers a movement or not. In a fifth step 725, when it is determined that the movement has stopped, then the electrical motor is stopped. In a sixth step 730 a count of the counter and a value of the absolute rotary position sensor is determined. In a seventh step 735 the first end stop is set to the position determined by the absolute rotary position sensor value and the count of the counter minus a predetermined amount. In an eighth step 740 the electrical motor/linear actuator is set to run in a second direction. In a ninth step 745 it is determined if the absolute rotary position sensor registers a movement or not. In a tenth step 750, if it is determined that the movement has stopped, then the electrical motor is stopped. In an eleventh step 755 the count of the counter is read and the value of the absolute rotary position sensor is read. In a twelfth step 760 a second end stop is set to the position determined by the absolute rotary position sensor and counter, minus a predetermined amount. In a thirteenth step 765 the electrical motor power is set to a normal/nominal value. The fourteenth step 770 exits the routine/process.

The invention is not restricted to the above-described embodiments, but may be varied within the scope of the following claims.

FIG. 1 shows a view of a linear actuator unit according to the invention,
100 A linear actuator unit according to the invention
110 Spindle outer tube
111 Actuation rod, inner tube,
112 Transmission,
114 Electrical motor,
116 Control electronics,
118 Connector, power/control,
150 Absolute rotary position sensor.

FIG. 2 shows a cross section of a part of the linear actuator unit according to the invention,
212 Transmission,
213 Coupling to absolute position sensor,
217 Circuit board,
218 Power/control connector,
219 Connector to electrical motor,
252 First part of absolute position sensor, suitably a magnet or magnet ring, mounted directly or indirectly, i.e. coupled to, a rotating part of the linear actuator, such as a spindle or nut
254 Second part of absolute position sensor, suitably a hall effect sensor, mounted in proximity to the first part of the absolute position sensor, suitably on or coupled to the circuit board,
256 Circuitry to determine the rotary position, comprising a counter to count the number of over/under flows of the absolute rotary position sensor, and a memory for storage of the count at the time of power shutdown,
258 Power storage, such as a capacitor/battery to ensure that there is enough power to store the count when the linear actuator is shut down.

FIG. 3 shows a functional block diagram of the controller and absolute position sensor according to the invention,
340 Electrical power supply line(s),
343 Power supply regulator for electronic circuitry,
345 Regulated power supply to electronic circuitry,
348 Control circuitry for electrical motor power,
349 Power to electrical motor,
350 Absolute rotary position sensor,
358 Electrical power storage, such as a capacitor or battery, for supplying power to electronic circuitry during linear actuator shutdown,
360 Controller, such as a micro controller or ASIC (Application Specific Integrated Circuit),
362 Optional control signal lines,
364 Control signals from controller to control circuitry for electrical motor,
370 Memory for storage during shut down of a count of over/under flow of absolute rotary position sensor.

FIGS. 4A, 4B, and 4C show different types of absolute rotary position sensors and their output over a full turn.
405 Absolute rotary position sensor output,
407 Rotational position of spindle/nut/motor rotor/gear in transmission,
409 One full turn of spindle/nut/motor rotor/gear in transmission to which absolute rotary position sensor is coupled,
470 One full turn output of a one full turn absolute rotary position sensor,
473 First full range output of a one third partial turn absolute rotary position sensor,
474 Second full range output of a one third partial turn absolute rotary position sensor,
475 Third full range output of a one third partial turn absolute rotary position sensor,
478 First full range output of a partial turn absolute rotary position sensor,
479 Start of second full range output of a partial turn absolute rotary position sensor FIG. 5 shows a flow chart of a basic functionality of the absolute position sensor according to the invention,
510 Is there rotation?,
520 If there is rotation, are we still within absolute rotational position sensor range, or is there an under or overflow,
530 If there is an under or overflow, then adjust counter accordingly,
540 Is there a power loss/shutdown?
550 If there is a power loss/shutdown, then store count in non-volatile memory,
560 Optionally, if there is a power loss/shutdown, then also store the absolute rotary position sensor value.

FIG. 6 shows a flow chart of an optional check of a linear actuator with an absolute position sensor according to the invention,
600 If there is a power-up then do this routine/process,
610 Retrieve count stored in the non-volatile memory and update counter with this count,
620 Retrieve absolute rotary position sensor value stored in the non-volatile memory,
630 Acquire/determine current value of absolute rotary position sensor,
640 Compare retrieved value with current value, and if the difference shows that there has been an under or overflow during shutdown, then continue with step 650, otherwise continue with step 660,
650 If there has been determined that there has been an overflow or underflow during shutdown, then adjust counter accordingly,
660 Compare retrieved value with current value, and if the difference is less than a first amount, then exit routine/process without further action, otherwise continue with step 670
670 Compare retrieved value with current value in relation to a second amount,
680 If the difference is less than the second amount then do a warning action, can be a message sent back to a controller via communication network,
690 If the difference is equal or greater than the second amount then do an error action, such as a recalibration,
699 Further processing after power-up.

FIG. 7 shows a flow chart of an optional virtual end stop determination of a linear actuator with an absolute position sensor according to the invention, 705 If it is the first power-up or a recalibration, then do this routine/process,
710 Set electrical motor power to low/calibration value,
715 Set electrical motor/linear actuator to run in a first direction,
720 Check that the absolute rotary position sensor registers a movement,
725 When movement has stopped, then stop electrical motor,
730 Read count of counter, read value of absolute rotary position sensor,
735 Set first end stop to position determined by absolute rotary position sensor and counter minus a predetermined value,
740 Set electrical motor/linear actuator to run in a second direction,
745 Check that the absolute rotary position sensor registers a movement,
750 When movement has stopped, then stop electrical motor,
755 Read count of counter, read value of absolute rotary position sensor,
760 Set second end stop to position determined by absolute rotary position sensor and counter minus a predetermined value,
765 Set electrical motor power to normal value,
770 Exit routine/process.

The invention claimed is:

1. A linear actuator comprising:
an electrical motor,
a transmission,
a spindle,
a spindle nut,
an actuation element, and
a control unit,
wherein the electrical motor through the transmission and interaction between the spindle and the spindle nut drives the actuation element to move linearly between a first end stop and a second end stop,
wherein to determine a position of the actuation element, the control unit provides an absolute rotary position sensor outputting a value representing an angle and includes a counter keeping a count,
wherein the value is less than the angle through which the absolute rotary position sensor is subjected to during a movement of the actuation element between the first end stop and the second end stop, causing the value of the absolute rotary position sensor to under-flow or over-flow at least once during the movement and where the counter is arranged to keep track of the under-flows and over-flows of the value in the count,
wherein the control unit is arranged to determine end stops of the linear actuator by driving the electrical motor in both directions until the absolute rotary position sensor indicates that the actuation element is not moving, and
wherein the control unit comprises a non-volitile memory that is arranged to store the count of the counter when there is a shutdown of the linear actuator or when a rate of movement of the actuation element falls below a predetermined amount, or both.

2. The linear actuator according to claim 1, wherein the control unit is arranged to determine the end stops to be at a predetermined distance before the position indicated by the absolute rotary position sensor.

3. The linear actuator according to claim 1, the control unit is arranged by means of the absolute rotary position sensor to determine if there is movement of the actuation element when the actuator is not driven by the electrical motor, and if this is determined, then an alarm message is generated.

4. The linear actuator according to claim 1, wherein the absolute rotary position sensor is a full-turn or a partial-turn type.

5. The linear actuator according to claim 1, wherein the absolute rotary position sensor is not a multi-turn type.

6. The linear actuator according to claim 1, wherein the count stored in the non-volitile memory is retrieved and loaded into the counter when there is a startup of the linear actuator.

7. The linear actuator according to claim 1, wherein the value of the absolute rotary position sensor is stored in the non-volitile memory.

8. The linear actuator according to claim 7, wherein the value is retrieved from the non-volatile memory and compared to a current value of the absolute rotary position sensor to determine if there has been an under-flow or an over-flow during the shutdown.

9. A linear actuator comprising:
an electrical motor,
a transmission,
a spindle,
a spindle nut,
an actuation element, and
a control unit,
wherein the electrical motor through the transmission and interaction between the spindle and the spindle nut drives the actuation element to move linearly between a first end stop and a second end stop,
wherein to determine a position of the actuation element, the control unit provides an absolute rotary position sensor outputting a value representing an angle and includes a counter keeping a count,
wherein the value is less than the angle through which the absolute rotary position sensor is subjected to during a movement of the actuation element between the first end stop and the second end stop, causing the value of the absolute rotary position sensor to under-flow or over-flow at least once during the movement and where the counter is arranged to keep track of the under-flows and over-flows of the value in the count,
wherein the control unit is arranged to determine end stops of the linear actuator by driving the electrical motor in both directions until the absolute rotary position sensor indicates that the actuation element is not moving, and
wherein the control unit is arranged to drive the electrical motor at a limited torque or power level during an end-stop determination.

10. A linear actuator comprising:
an electrical motor,
a transmission,
a spindle,
a spindle nut,
an actuation element, and
a control unit,
wherein the electrical motor through the transmission and interaction between the spindle and the spindle nut drives the actuation element to move linearly between a first end stop and a second end stop,
wherein to determine a position of the actuation element, the control unit provides an absolute rotary position sensor outputting a value representing an angle and includes a counter keeping a count,
wherein the value is less than the angle through which the absolute rotary position sensor is subjected to during a movement of the actuation element between the first end stop and the second end stop, causing the value of the absolute rotary position sensor to under-flow or over-flow at least once during the movement and where the counter is arranged to keep track of the under-flows and over-flows of the value in the count, wherein the control unit is arranged to determine end stops of the linear actuator by driving the electrical motor in both directions until the absolute rotary position sensor indicates that the actuation element is not moving, and wherein the control unit is arranged by means of the absolute rotary position sensor to determine if there is movement of the actuation element when the actuation element is not driven by the electrical motor, and if this is determined, then the electrical motor is activated to oppose this movement and thus create an active stop of movement.

* * * * *